United States Patent Office 3,451,043
Patented June 17, 1969

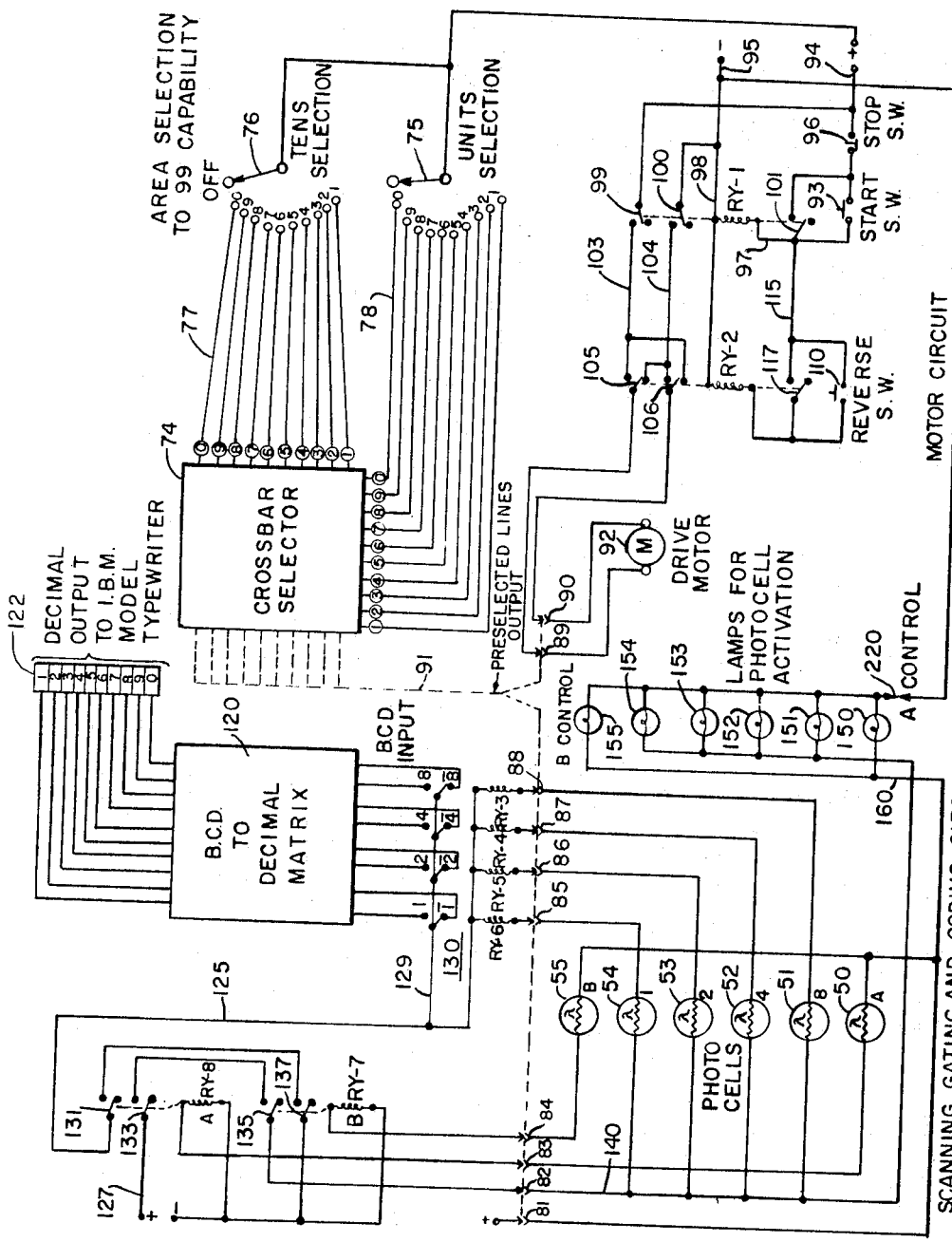
FIG_1

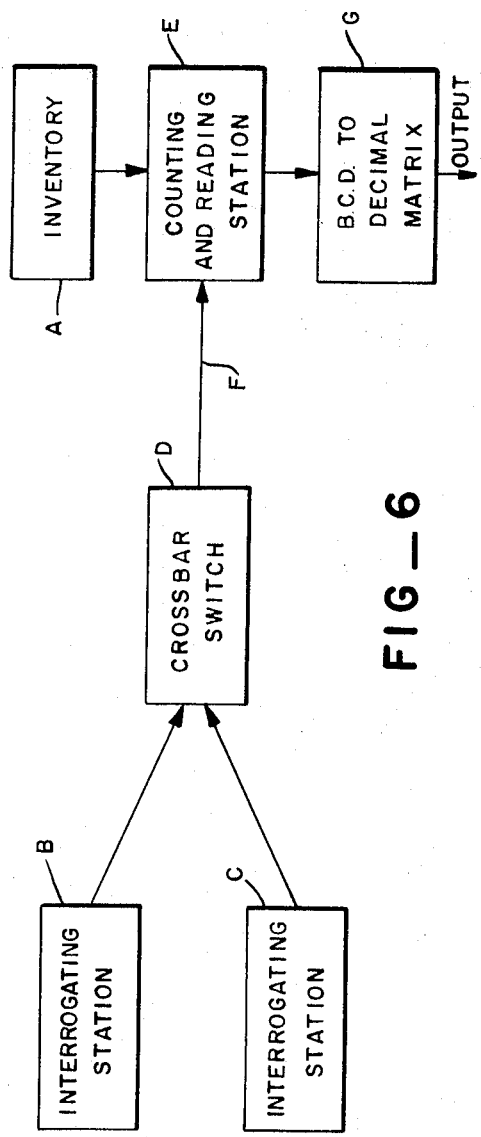

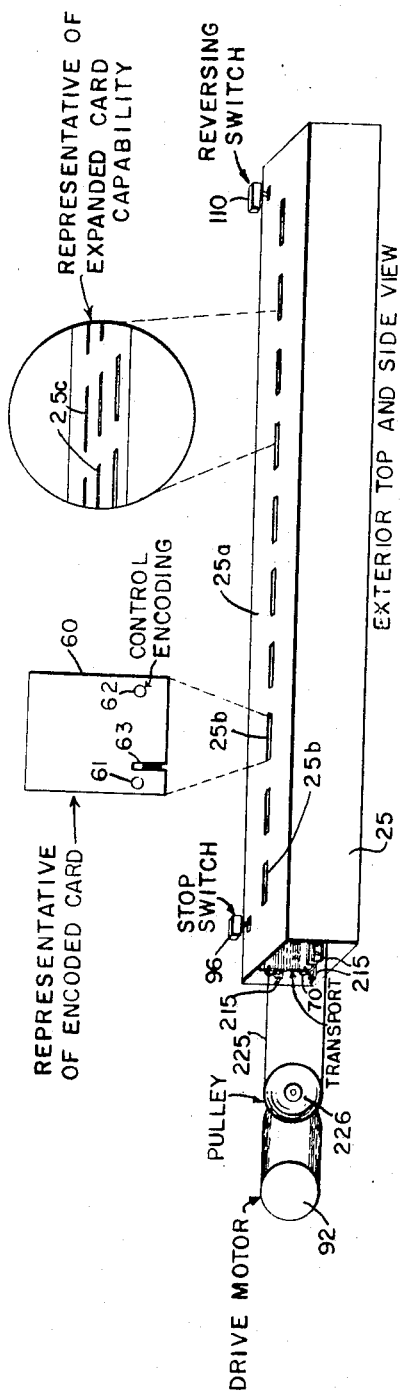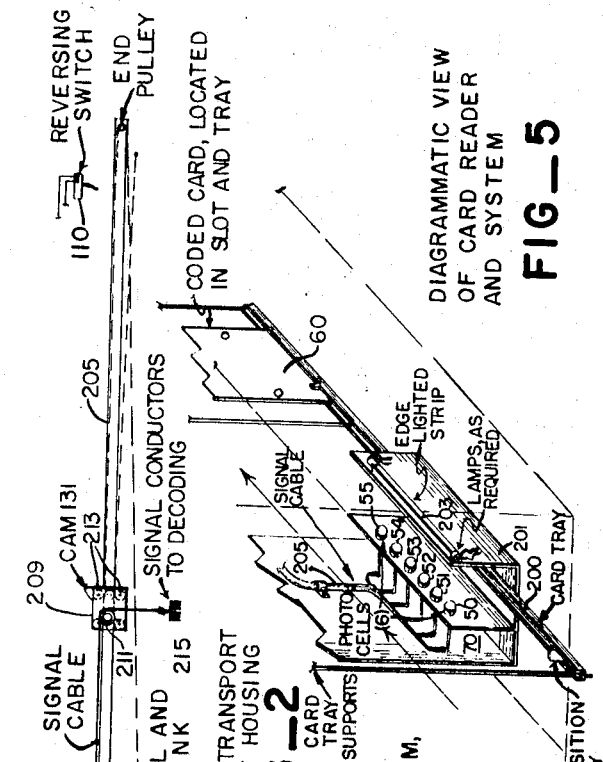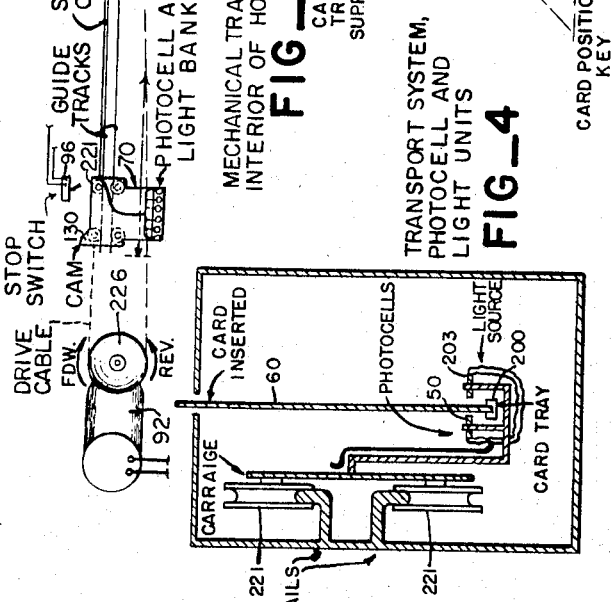

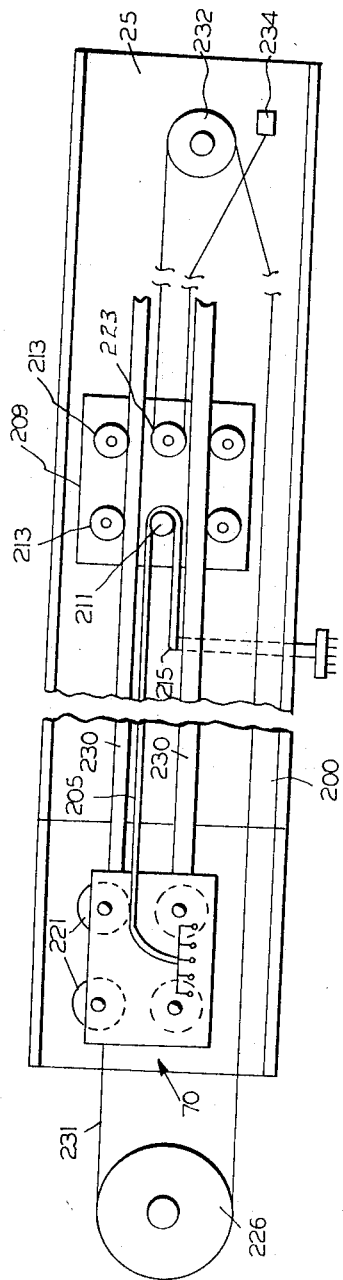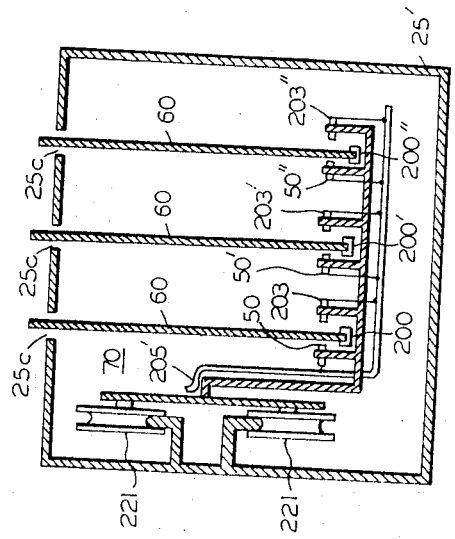

3,451,043
COMPONENTS AND SYSTEM FOR USE WITH INVENTORY INTERROGATING CONTROL AND READOUT METHOD AND APPARATUS
Stephen R. Krause, 6703 Townbrook Road, Baltimore, Md. 21207
Continuation-in-part of applications Ser. No. 186,227, Apr. 9, 1962, and Ser. No. 516,815, Nov. 4, 1965. This application Feb. 21, 1966, Ser. No. 528,740
Int. Cl. H04q *3/42*
U.S. Cl. 340—152     18 Claims

ABSTRACT OF THE DISCLOSURE

The invention is particularly concerned with reading tag means usually attached to inventory items for collecting coded information with respect to predetermined characteristics of the inventory units. It comprises means for receiving and positioning the tag means with the movable carriage adapted to be moved relative to the tag means. Means are included for reading the code on the tag means and to relay the predetermined characteristics and numerical quantities of the inventory in digital readout form.

---

The present invention relates to components and system for use with inventory interrogating control and readout method and apparatus, and is a divisional continuation-in-part of my application, Ser. No. 516,815, filed Nov. 4, 1965, which a continuation of application, Ser. No. 186,227, filed Apr. 9, 1962 (now abandoned), and has as an object to provide components and apparatus enabling an installation containing such equipment to count, for example, items of clothing, merchandise or various forms of other materials which are kept on racks, shelves or tables in remote locations in such places as manufacturing establishments, retail stores or wholesale houses.

The equipment, circuitry and method of the invention permits an individual to take a count of a particular item, for example, by dialing on a dial a number and designation or size of the item into the equipment whereby the equipment will scan the entire system, or segments of the system, and relay back to a digital readout such information as the correct quantity currently in stock at that moment of a particular size, style, manufacturer, color or price range of the item being scanned for, be it suit, dress, uniform, or other wearing apparel.

Another object of the invention is to provide components and circuitry for use in a system and equipment adapted for rapidly determining inventory of any type including hanging items and bulk quantity items such as those stored in bins or shelves, which item is capable of supporting or having connected thereto an identification means which is interrogated by the apparatus of the system.

More particularly, it is an object of this invention to provide electrically and photoelectrically operable scanning apparatus which will read individually and collectively quantities of then physically present inventory at high speed.

A further object of the invention is the provision of unique apparatus and methods for providing identification of multiple characteristics of the items stored, such as size, color, style or manufacturer, including any of the foregoing individually or collectively.

A still further object of the present invention is the provision of identification media which may be in the form of tags, hangers, or appendages which may be attached to the inventory items, which appendages may be either electrically scanned, mechanically scanned or photoelectrically scanned.

A still further object of the invention is the provision of such a method and apparatus suitable for installation in existing warehouses, retail stores or the like for collecting data instantaneously.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a schematic electrical circuit diagram of a universal scanning embodiment for selecting and reading out the inventory of any predetermined section, rack or module being particularly illustrated with the photoelectric scanning embodiment of the invention;

FIGURE 2 is a mechanical schematic representation of a scanning arrangement adapted for use with a single rack or module unit in accordance with the present invention;

FIGURE 3 is a view in perspective in accordance with the embodiment of FIGURE 2;

FIGURE 4 is an end elevational view taken from the left-hand end of FIGURE 3;

FIGURE 5 is a magnified perspective view with parts shown in section of traversing counting mechanism of FIGURES 2 and 3;

FIGURE 6 is a block diagram showing the basic components and arrangement thereof in a system for inventory interrogating control and readout in accordance with the present invention;

FIGURE 7 is an enlarged view particularly showing the cable and drive arrangements for the scanning means of FIGURE 2, and FIGURE 8 is a view in section similar to FIGURE 4 but for accommodating the multiple rows of tag means in cooperation with the enlarged portion of FIGURE 3.

The present invention is compatible with and improves over the system heretofore devised by me, as is best seen from a consideration of the block showing in FIGURE 6. An inventory of units A is operated on by the system from a plurality of interrogating stations B and C through cross bar switch D which establishes connection to counting and readout station E over line F and also connects BCD to decimal matrix block G to receive and convert the inventory output data.

With this block showing in mind, the detailed compatible and improved arrangements will next be described.

The components, circuitry and method depicted in the drawings are adapted to operate in a system of the type disclosed in my continuation application above-identified, wherein it may be desired to inventory a predetermined section, rack or module for information with respect to the items presently stored therein or thereon.

An operator through a keyboard or dialing system or the like dials the address of the section which in turn activates the scanning mechanism at that section to relay back the information desired. The information may be printed out or visually presented, or both.

In FIGURE 1 there is shown electrical circuitry and apparatus suitable for selecting and activating the scanning equipment associated with any predetermined rack or module.

The circuitry of FIGURE 1 is directed to a photocell type scanning arrangement. However, it is necessary to select not only the scanning motor to be employed, but also the reading assemblies and thus the circuitry will handle either embodiment.

In FIGURE 1 there are shown six photocells designated 50 through 55 which are adapted to scan tags or cards such as card 60 shown in FIGURE 3. These cards have apertures 61 and 62 for gating purposes and one or more slots such as 63 for information or data purposes. The photocells 50 through 55 are carried rapidly past the card 60 by the carriage 70 (FIGURES 2 and 3).

Photocell 50 reads control aperture 61 and simultaneously therewith photocell 55 reads control aperture 62 to gate on the readout circuitry permitting photocells 51 through 54 to determine the data carried by card 60.

It may therefore be appreciated that the photocell readout is even more rapid and accurate than the mechanical switching arrangement described hereinabove. It should of course be noted that either type of arrangement can accommodate various numbers of coding channels or gating controls.

Thus in FIGURE 1 it will be realized that while an area or rack selection arrangement having a capability to 99 is illustrated, the capability can be enormously increased following the principle of the teaching herein described.

A conventional cross bar selector 74 having a capability of ten selector bars, ten hold bars and ten levels (10×10×10), which could handle up to one hundred racks and which in turn could be duplicated or repeated to increase the capacity of the inventory system, is employed as the main switching element for activating a plurality of scanning mechanisms.

Cross bar technology is so well known, as for example in long distance telephone selection dialing, that it is depicted in block diagram only for the sake of simplicity.

Through the use of this circuitry, random or sequential scanning can be achieved because each tag is unique. The racks are identified in the example presented by the numbers 1 to 99. The operator merely sets the unit's selector arm 75 and the ten's selector arm 76 to the rack number for the machine to proceed automatically to search out the proper tag and relay the information contained thereon back to the operator. While selector arms 75 and 76 have been depicted for manual operation it will be apparent that these switches can be set automatically as by dialing or push button keyboard or from electrical sequential equipment for automatic interrogation.

The ten leads such as 77 extend from the ten's contacts for arm 76 to, for example, the circuit bars (not shown) of cross bar selector 74. Similarly the ten leads 78 for the unit's selection extend to the hold bars of cross bar selector 74.

For example, assume that the rack or module to be scanned is identified as number 25. The unit's arm 75 will be set to its contact button 5 and the ten's arm 76 to its contact button 2 so that the cross bar selector closes ten levels physically indicated by the contacts 81 through 90, in accordance with the flow depicting line 91 showing that the particular scanning mechanism illustrated below the contacts 81 through 90 is activated for this particular setting of the selection switches set to 25.

It should be realized that the apparatus selected comprises only one unit of the ninety-nine units selectable, which units need not necessarily be duplicates but will operate in accordance with the principles herein set forth. Closing of contacts 89 and 90 actuates drive motor 92 for carriage 70 (FIGURES 2 and 3).

Once the ten levels of cross bar levels have been set up, the operator may initiate the scanning operation by pressing start button 93 which is of the momentary closing type and automatically opens upon its release by the operator. This applies forty-eight volts D.C. from terminals 94 and 95 through the closed stop switch contact 96, start switch contacts 93 to operate relay RY–1 over leads 97 and 98. This causes relay coil RY–1 to lift contact armatures 99 through 101 to their upper positions.

Closure of contact armatures 99 and 100 applies power over leads 103 and 104 through contacts 105 and 106 of reversing relay coil RY–2 to supply driving power to motor 92 in the forward direction.

Carriage 70 moves the entire length of rack 25 and scans all cards such as 60 in that rack.

When it reaches the end of the rack it actuates reversing switch 110 (FIGURES 1 and 3) momentarily to close this switch actuating relay coil RY–2 over leads 98 and 115, thereby reversing contacts 105 and 106 to supply driving power to motor 92 of reverse polarity causing carriage 70 to return to its home position where it comes to rest by actuating stop switch 96 (FIGURES 1 and 3). Actuation of stop switch 96 breaks the circuit from supply terminals 94 and 95, releasing both coils RY–1 and RY–2.

It should be noted that a holding circuit by-passing start switch 93 is represented by contact 101 during scanning operation including carriage return. Similarly relay contacts 117 of coil RY–2 provide a holding circuit by-passing reverse switch 110 for return of the carriage.

Considering now the data retrieval function of the apparatus and the timing thereof, it will be appreciated that the information sensing photocells 51 through 54 are connected by cross bar selector contacts 85 through 88 to a conventional BCD to decimal conversion matrix 120. The purpose of this matrix is to change the binary coded information carried by the cards 60 and coded in conventional manner to decimal signal output suitable for driving an electric typewriter or other print-out device. The decimal output information appears at terminal board 122 for connection to any well-known type visual display device or print-out device.

Any of the photocells 51 through 54 receiving light through slotted aperture 63 of card 60 will activate its relay coil RY–3 to RY–6 because B— is applied to lead 125 from terminal 127 under control of relay coil RY–8.

This B— connection is established by the gating mechanism when photocells 55 and 50 simultaneously receive light. The cross bar selector contacts 83 and 84 establish connections from photocells 50 and 55 to relay coils RY–8 and RY–7, respectively. These two relay coils have their contacts connected in an AND circuit so that both signals must be present in order to supply B— over lead 125 to the coils RY–3 to RY–6 and also to supply B— over lead 125 and 129 to the on-off switches, generally shown at 130, depicting the condition signal or no signal of photocells 51 through 54 in binary notation to serve as the BCD input to matrix 120.

In the drawing the on-off switches 130 are all illustrated in the signal present position with all coils RY–3 to RY–6 being energized, thus a signal is present in the 1's, 2's, 4's and 8's places.

The AND or gating circuitry under control of photocells 50 and 55 will now be described. When photocell 50 receives a light signal, a circuit is set up through cross bar selector contact 83 to energize RY–8. This closes its armatures 131 and 133 to their up position. Similarly the presence of a signal at photocell 55 sets up relay coil RY–7 through cross bar selector contact 84 to move its armatures 135 and 137 to their upper position. The result of these movements at least overlapping in time extends B— over lead 127 through now closed armature 133 *and* now closed armature 135 to cross bar selector contacts 82, thereby applying B— to the reading photocells 51 through 55 over their common anode supply lead 140.

The lamps which supply light for photocells 50 through 55 and are also carried by carriage 70, are shown in the circuit of FIGURE 1 at 150 through 155. Lights 150 and 155 supply the gating photocells 50 and 55. These two photocells are connected over lead 160 to cross bar selector contact 81 which extends to B+ whereas the other photocells 151 through 154 are connected over lead 140 to receive B+ at the same time that their photocells 51 through 54 receive B—.

It should be noted that when there is an absence of a card in rack 25, gating photocells 50 and 55 will establish B— as described above to the other photocells so that all photocells are lighted. However, this binary count would represent a total of fifteen. Thus the decimal matrix 120 will only output zero to 9 and therefore such erroneous signal is not converted in matrix 120.

FIGURES 2 through 5 show details of the mechanical construction of the scanning, gating and reading mechanism. The rack 25 includes a slotted cover 25a having elongated slots 25b therethrough adapted to receive cards 60 at predetermined spaces. The rack interior is equipped with guides or channels 200 (FIGURE 2) which receive the lower edges of cards 60 at predetermined locations. The cards are retained in proper position in guide 200 by the edges of the upper slots 25b.

Carriage 70 includes a frame 201 which carries the photocells 50 through 55 in spaced-apart position with the edge lighted strip 203 containing lamps 150 through 155, thus the card 60 is interposed between the photocells and lamps as is best seen in FIGURE 4.

The invention incorporates a unique electrical connection assembly for the photocells and lamps carried by carriage 70. All leads including those from edge lighted strip 203 are connected into cable 205 (FIGURES 2 and 5) which extends to a further carriage or car 209, including a pulley 211 and wheels 213 set in tracks 215 (FIGURE 3). The purpose of car 209 is always to take up the slack in cable 205 which is fixed at 215 and thence of course extends to cross bar selector contacts 81 through 88 and contact 220. Carriage 70 may be provided for extending the number of lamps and photocells for flexibility as best seen in FIGURES 3 and 8.

Carriage 70 also includes wheels 221 which ride tracks 215 and is attached to drive cable 225 extending about pulleys such as 226 located at either end of rack 25.

The stop switch 96 and reversing switch 110 are operable by either of the cams 130 or 131, respectively, carried by carriage 70 and car 209. Since high speed operation is desirable this safety factor is provided.

FIGURE 7 corresponds to FIGURE 2 in enlarged detail. The rack 25 is shown with the right hand side removed to better depict the components. Carriage 70, riding on wheels 221, carried by rails 230, is connected to the slack car 209 because cable 205 encircles pulley 211, carried by the slack car and is fixed to rack 25 at location 215. For this arrangement, cable 205 is half as long as the movable path in rack 25.

In order that slack car 209 performs its function in taking up the slack in cable 205, the drive cable 231 is fixed to carriage 70 and extends around drive pulley 226 to a fixed or end pulley 232, carried by rack 25, and then encircles pulley 223 carried by car 209 to terminate at the fixed location 234 near the fixed pulley 232. Thus it may be seen that this drive arrangement will permit both forward and reverse drive while maintaining the slack absorbing function.

In FIGURE 3 there is presented an embodiment capable of handling even more data through the use of several rows of slots 25c for accommodating a larger number of cards for multiple reading. In addition it will be appreciated that a greater amount of information can be carried on the cards, such as card 60, by arranging horizontally spaced-apart reading and coding rows with the carriage containing a corresponding number of photocells and lamps.

In FIGURE 8 there is shown the details to cooperate with the multiple row of slots 25c of FIGURE 3. The carriage 70 and its function are identical to that explained with the exception that the support for the photocells, such as 50 and edge lighted strips, such as 203 is extended to carry the further sets of photocells such as 50′ and 50″ and the lighting 203′ and 203″. The extra tags or cards are supported along the bottom edges by additional guides 200′ and 200″. The electronic circuitry is simply duplicated for each additional row, and cable 205′ carries the extra leads, thus enabling triple totals to be accumulated.

What is claimed is:

1. In inventory control system comprising an interrogating and readout station selectively connectable to a plurality of inventory areas containing then physically present inventory tagged with tag means having openings therethrough indicative of coded information representative of predetermined charactistics of inventory units, a plurality of inventory counting units adapted to receive the coded tag means, each comprising
   (a) coded tag support means adapted to receive and support the tag means,
   (b) traversing reading means in electrical communication with said interrogating and readout station movable along a line of coded tag means carried on said support to electrically read the coded information on said tag means and relay predetermined characteristics and numerical quantities of said inventory in digital readout form at the readout station remote from the inventory area.

2. An inventory counting device as claimed in claim 1 wherein said traversing reading means photo-electrically reads coded openings through the tag means without physical contact therewith.

3. A system of inventory interrogating control comprising in combination
   (a) at least one interrogating station,
   (b) cross bar means connected to the interrogating station,
   (c) counting and readout means physically associated with the inventory, comprising coded tag means attached to the inventory,
   (d) connecting means between the cross bar means and counting and readout means to select that section of the inventory to be interrogated, and
   (e) conversion means connectable to the counting and readout means under control of the cross bar means to provide output information relative to the inventory.

4. The system of claim 3 wherein said counting and readout means are adapted to develop a coded binary output and said conversion means comprises a BCD to decimal matrix.

5. The system of claim 3 wherein said inventory comprises a plurality of inventory storage areas containing then physically present inventory, coded tags being said tag means associated with said inventory, and said counting and readout station comprises scanning means associated with each inventory area to move relative to the inventory units and read said coded tages.

6. The system of claim 5 wherein said cross bar means is adapted to select any of said inventory areas and the counting and readout means associated therewith and initiate the scanning operation under control of the interrogating station.

7. The system of claim 6 wherein the tags are coded in a binary code and the conversion means comprises a BCD to decimal matrix.

8. The system of claim 5 wherein said scanning means comprises a movable carriage and track therefore, and photoelectric reading means carried by said carriage to read said tags.

9. The system of claim 8 including a further carriage adapted to move along said track means and an electrical cable connected from said photoelectric reading means via said carriage to said further carriage, and thence to a fixed location external of said track to maintain the cable slack free while permitting the scanning operation.

10. An inventory control system comprising in combination
   (a) cross bar selector means,
   (b) a plurality of selection means connected to said cross bar selector means to enable an operator to set therein a digital number, said cross bar selector means comprising (c) a plurality of contacts uniquely set up by each digital number set into the selection means, (d) reading and counting means associated with the inventory, (e) drive means associated with the reading and counting means, (f) means for energizing the reading and counting means over certain of the contacts of said cross bar selector means, (g) means for energizing the drive means over further contacts of said cross bar selector means, (h) a BCD to decimal matrix, and (i) means connecting the counting and reading means over different contacts of said cross bar selector means to said BCD to decimal matrix.

11. The system of claim 10 further comprising coded tags assocaited with each inventory unit, which tags are positioned to be scanned by said counting and reading means, and means for positioning the tags to be read in said position.

12. The system of claim 11 wherein said reading and counting means comprises a plurality of photoelectrically actuable means for reading said coded tags.

13. The system of claim 12 wherein said coded tags include a synchronizing code and an informational code, and said photoelectric means comprise photocells adapted to read said codes.

14. The system of claim 13 further comprising an AND circuit an dwherein at least two of said photocells are connected to said AND circuit, whereby said two photocells when sensing the synchronizing code from said tags energize selected ones of the other photocells to read the information code.

15. The system of claim 14 further comprising a switching circuit connected between said other photocells and said BCD to decimal matrix to convert the code into binary information for input to said BCD to decimal matrix.

16. The system of claim 15 further comprising reversing circuitry for said driving means actuable by the counting and reading means.

17. Scanning means for use in an inventory interrogating system wherein the inventory units are identified as to their characteristics by coded tags physically attached thereto, comprising (a) means for receiving and positioning said tags, (b) a movable carriage adapted to be moved past said so-positioned tags, (c) means carried by said movable means for reading the code on said tags, (d) means for driving said movable means, and (e) means for reversibly driving said reading means.

18. Scanning means for use in an inventory interrogating system as claimed in claim 17, further comprising (f) a second movable means displaced from said first movable means and associated therewith to move independently thereof, and (g) cable means between said first and second movable means adapted to slide relative to said second movable means and to be kept slack free by said second movable means.

References Cited

UNITED STATES PATENTS

| | | | |
|---|---|---|---|
| 2,661,682 | 12/1953 | Saunders | 235—91.14 |
| 3,126,837 | 3/1964 | Noye et al. | 340—149 X |
| 3,340,509 | 9/1967 | Krause | 340—149 |
| 1,927,556 | 9/1933 | Nelson. | |

DONALD J. YUSKO, *Primary Examiner.*